(No Model.) 2 Sheets—Sheet 1.

C. N. TEETOR.
RAILWAY VELOCIPEDE.

No. 569,683. Patented Oct. 20, 1896.

Witnesses

Charles N. Teetor
— Inventor —

By _____ Atty (No Model.) 2 Sheets—Sheet 2.

C. N. TEETOR.
RAILWAY VELOCIPEDE.

No. 569,683. Patented Oct. 20, 1896.

Witnesses
Charles N. Teetor.
Inventor

UNITED STATES PATENT OFFICE.

CHARLES N. TEETOR, OF HAGERSTOWN, INDIANA.

RAILWAY-VELOCIPEDE.

SPECIFICATION forming part of Letters Patent No. 569,683, dated October 20, 1896.

Application filed August 10, 1895. Serial No. 558,923. (No model.)

*To all whom it may concern:*

Be it known that I, CHARLES N. TEETOR, a citizen of the United States, residing at Hagerstown, in the county of Wayne and State of Indiana, have invented certain new and useful Improvements in Railway-Velocipedes; and I do hereby declare the following to be a full, clear, and exact description of the invention, such as will enable others skilled in the art to which it appertains to make and use the same.

My invention relates to railway-velocipedes of that class using four wheels, and which is especially designed to be propelled by footpower; and the improvements relate, first, to a foldable construction of the frame whereby the area of wheel-base may be reduced when it is desired to transport or store the machine, and, secondly, to the construction of the rim for the wheels.

With these ends in view my invention consists in the combination, with a frame having bearings at its ends for the front and rear axles, and a crank-shaft bearing, a rear axle, a crank-shaft geared to said axle, of a front axle fitted with journals and having an arched, curved, or bent brace which is supported in the handle-bar, sectional braces joined to the front and rear axles, and each brace having its members connected together by a prop-joint, which permits the brace to break or be thrown in an upward direction, so that the front axle and its arched brace may be turned to throw the arched ends and the wheels thereon in an inward direction toward the rear wheels and rear axle, and suitable clamps for holding the arched brace in place when the braces are depressed or straightened out; and the invention further consists in the combination of devices and in the novel construction and arrangement of parts, which will be hereinafter more fully described and claimed.

My improvements are capable of use in connection with velocipedes which are provided with either single or double saddles to carry one or more persons, although in the annexed drawings I have only shown the invention as applied to a single-saddle machine, but I would have it understood that I hold myself at liberty to construct a tandem velocipede embodying my invention.

To enable others to understand my invention, I have illustrated the preferred embodiment thereof in the accompanying drawings, forming a part of this specification, and in which—

Figure 1:
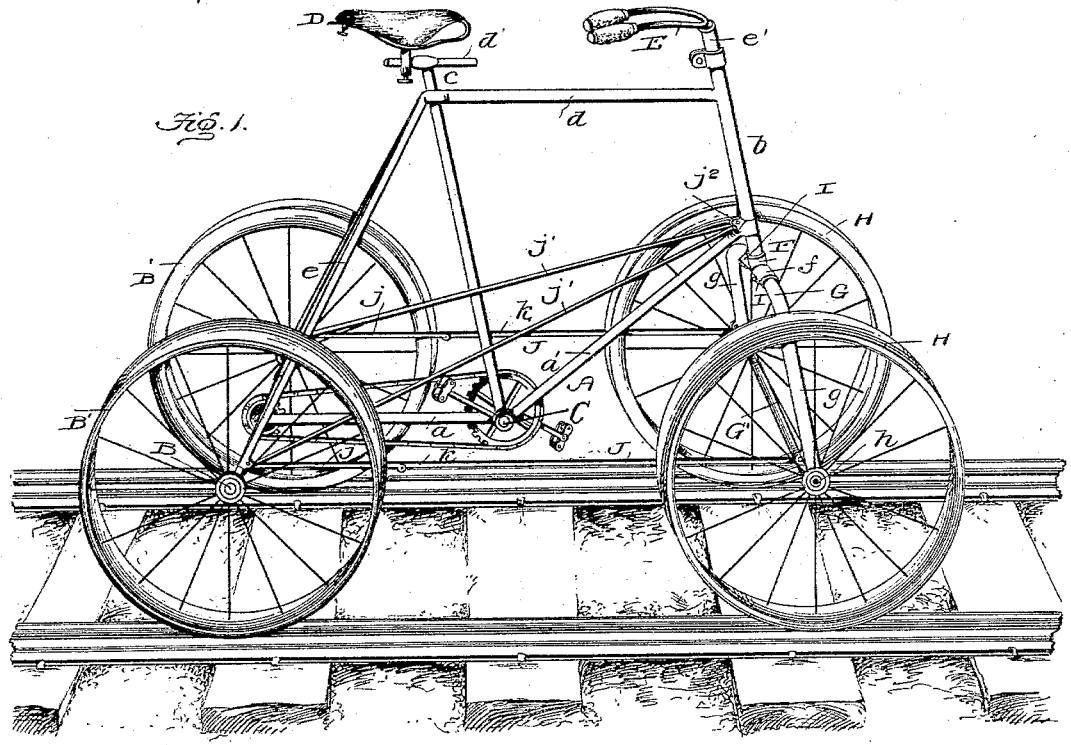
Figure 3:
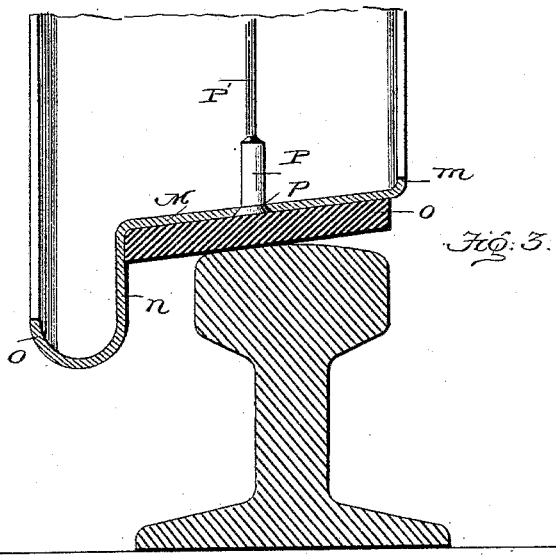
Figure 2:
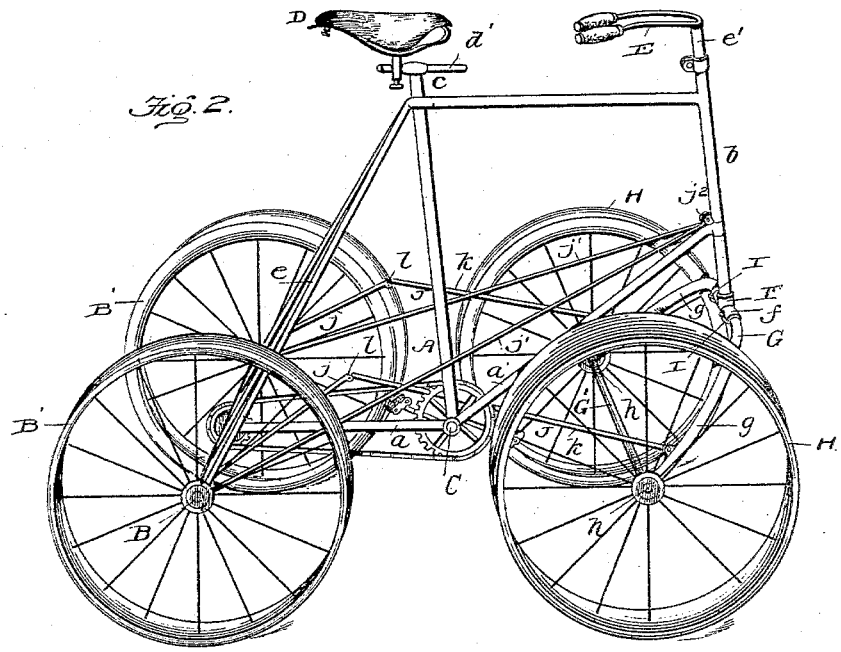
Figure 4:
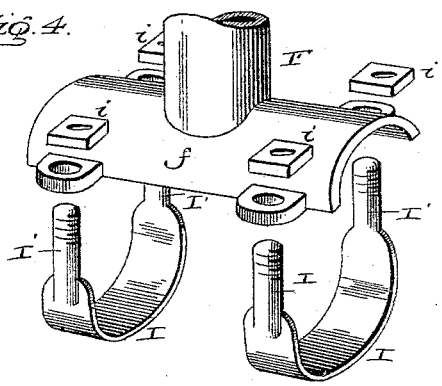

Figure 1 is a perspective view of my railway-velocipede, showing it adjusted or in condition for use. Fig. 2 is a similar view illustrating the velocipede with the front axle-brace and wheels thrown back toward the rear axles and wheels to reduce the wheel-base. Fig. 3 is a detail view illustrating the arched brace, bearing, and clamp. Fig. 4 is an enlarged detail sectional view through the preferred construction of the rim.

Like letters of reference denote corresponding parts in all the figures of the drawings, referring to which—

A designates the frame of my four-wheel railway-velocipede, which frame is approximately "diamond-shaped," consisting of the inclined bottom bars $a$ $a'$, the steering-head $b$, the saddle-pillar $c$, the top bar $d$, between the steering-head and saddle-pillar, and the rear braces $e$, which are joined to the pillar $c$ and top bar $d$ at their upper ends, and which have their lower ends suitably fastened to sleeve connections fitted on the rear axle.

B is the rear straight axle, suitably fitted in a sleeve or bearing on the lower frame-bar $a$, and at its ends this axle B has suitable journals on which are fitted and secured the hubs of the rear wheels B'.

C is the crank-shaft, mounted in a suitable bearing at the juncture of the bars $a$ $a'$ of the frame A; and said shaft has the usual cranks and pedals and is geared, by sprocket-chain and wheel-gearing, to the rear axle B of the velocipede, whereby the machine may be propelled by foot-power.

D is the saddle, clamped to a post $d'$, fitted and clamped in the pillar $c$.

E is the handle-bar, carried by the stem $e'$, which is fitted in the usual way in the steering-head $b$. At the lower end of the steering-head is a forging F, to which is secured the stem $e'$ of the handle-bar E, and this forging has a horizontal sleeve $f$. Through this sleeve $f$ is passed the brace G, the ends of which are curved or bent to form the arched portions $g$ $g$, and said arched ends $g$ of the brace are attached in any suitable way to the straight front axle G'.

On journals of the front axle G' are loosely fitted the hubs of the front wheels H H, and these wheels are free to turn or rotate on the journals of the front axle. The straight middle part of the brace G is fitted in the sleeve $f$, to turn or rock therein, in order that the arched ends of the brace, the axle G', and the wheels thereon may be thrown or adjusted toward the rear axle and rear wheels, so as to reduce the distance between the front and rear wheels, or, in other words, lessen the wheel-base of the vehicle, in order that the machine may be easily transported or carried and be stored in a small space; but when the velocipede is to be used the front axle G' and its brace G are adjusted so its wheels will ride upon the rails of a track, as shown by Fig. 1, and when so adjusted this front axle is held rigidly in place by means of clamps I and the jointed braces J. These clamps I are carried by the sleeve or forging in which the axle G' is fitted, and said clamps are arranged to bear upon the brace.

One form of clamp that may be used is shown by Fig. 4 of the drawings, in which it appears as a curved metal strap partially embracing the axle and having its threaded shanks passed through apertured ears on the sleeves $f$ and held in place by means of nuts $i$, which are screwed on said threaded shanks to bear upon the ears, the nuts being tightened or loosened according as it is desired to bind the clamp upon the axle or release it from the axle; but I do not strictly limit myself to this particular style of clamp, as I am aware that the form of clamp may be modified by a skilled mechanic without departing from the principle of my invention.

The jointed braces extend between the two axles B G' of the vehicle, and they are disposed or arranged on opposite sides of the frame proper, A. Each brace is made, preferably, of two parts $j$ $k$, which are connected by a prop-joint $l$, which, when the members $j$ $k$ are in line, holds the brace stiff and rigid. One end of each brace is pivotally connected to a lug or ear on the front axle, while the rear end of each brace is pivoted to the sleeve or collar on the rear axle, to which one of the inclined braces $e$ is jointed.

To adjust the front axle and its brace, the clamps I are released and the braces J are pressed upward by hand-pressing against the joints $l$, so as to break the joint and force the members $j$ $k$ into inclined positions; and by thus moving the braces the brace G is turned in the sleeve $f$, so that its arched ends and the wheels H are drawn toward the rear axles and wheels thereon, thus lessening the wheel-base.

To adapt the velocipede for use, the braces J are straightened by pressing down on the joints $l$ and the clamps I are tightened around the brace G, whereby the brace and the front axle are held rigidly in place. It will be noted that this adjustment of the front axle can be readily and quickly accomplished without detaching any of the parts of the machine.

Each wheel of the velocipede has its rim constructed and equipped with a noise-deadening tire in the manner illustrated by Fig. 3 of the drawings. The rim M of the wheel is made from sheet metal, and at one side said rim is turned up slightly, as at $m$, while the opposite edge of the rim has a pendent flange $n$, the free edge of which is curved outwardly to form the guard $o$, all of the parts being integral with the rim. At suitable points in this rim are formed transverse openings $p$, through which are fitted the nipples P, the outer ends of which are headed or enlarged to bear against the tread or outer surface of the rim, and in these nipples are secured the ends of the spokes P'.

O is the noise-deadening tire, made of rubber or other suitable material. The tire is fitted snugly around the tread-surface of the rim M, across the same between the pendent flange $n$ and the other side flange $m$, and said tire conceals and protects the headed or enlarged ends of the spoke-receiving nipples P, as shown. The tire is secured to the rim M in any suitable way.

It is thought that the operation and advantages of my invention will be readily understood and appreciated from the foregoing description taken in connection with the drawings.

The frame of the machine is further strengthened by means of the inclined rods $j'$, which have their front ends connected to the head $b$, as at $j^2$, while the rear ends of the rods are attached to the lower ends of the brace $e$. (See Fig. 1.)

It will be understood that the position of the velocipede on the track is controlled by the rails on which the wheels travel and that the handle-bar E is used, primarily, as a rest or support for the operator.

Having thus fully described my invention, what I claim as new, and desire to secure by Letters Patent, is—

1. A railway-velocipede having one of its axles mounted to rock or turn a limited distance in its support, in combination with jointed braces connected to the movable axle, for the purposes described, substantially as set forth.

2. A railway-velocipede having one of its axles arched and mounted to rock or turn in its bearing to adjust the wheels thereon close to the wheels on the other axle, in combination with prop-jointed braces connected to the two axles, and clamps engaging with the adjustable axle to hold the same in fixed relation to the other axle, substantially as and for the purposes described.

3. In a railway-velocipede, the combination with a rear axle, of a sleeve $f$, an arched axle fitted in the sleeve and adapted to turn or rock therein, clamps carried by the sleeve and engaging with the arched axle, and jointed braces pivoted to the front axle, substantially as described, for the purposes set forth.

4. In a railway-velocipede, the combination with a suitable frame, and a rear straight axle having the wheels B', of a forging F having the axle-sleeve f, the arched axle fitted in said sleeve and carrying the wheels H at its outer arched ends, clamps carried by the sleeve and embracing said axle G, and jointed braces connected to said front and rear axles, substantially as and for the purposes described.

5. In a railway-velocipede, the combination with a frame having the reach-bars and a steering-head, of a rear axle carried by the frame, a front axle on the steering-head, the diagonal braces on opposite sides of the reach-bar and attached at their respective ends to the steering-head and the rear axle, and wheels on said axles, substantially as and for the purposes described.

6. In a railway-velocipede, the frame having a steering-head, the reach-bars, and the inclined rear bars e, combined with a front axle on the steering-head, a rear axle supported by the reach, the wheels on the ends of said axles, and the diagonal braces on opposite sides of the reach and attached at their ends to the steering-head and the rear axle, respectively, substantially as described.

7. In a railway-velocipede, the combination with a frame, a rear wheeled axle, and a steering-head, of an adjustable wheeled front axle having means for holding the same in rigid relation to the head, and diagonal braces joined to the head and the rear axle, substantially as described.

In testimony whereof I affix my signature in presence of two witnesses.

CHARLES N. TEETOR.

Witnesses:
J. H. TEETOR,
J. F. H. MOTHERSHEAD.